United States Patent [19]

Lux et al.

[11] 4,225,885

[45] Sep. 30, 1980

[54] METHOD AND APPARATUS FOR ADAPTIVE TRANSFORM CODING OF PICTURE SIGNALS

[75] Inventors: Peter Lux; Jürgen Petzold, both of Hamburg, Federal Republic of Germany

[73] Assignee: U.S. Philips Corporation, New York, N.Y.

[21] Appl. No.: 877,382

[22] Filed: Feb. 13, 1978
(Under 37 CFR 1.47)

[30] Foreign Application Priority Data

Feb. 12, 1977 [DE] Fed. Rep. of Germany ....... 2706080

[51] Int. Cl.² .............................................. G06K 9/12
[52] U.S. Cl. ........................................ 340/146.3 AG
[58] Field of Search .......... 340/146.3 MA, 146.3 AG, 340/146.3 H, 347 AD; 356/71; 358/260

[56] References Cited

U.S. PATENT DOCUMENTS

| | | | |
|---|---|---|---|
| 3,662,341 | 5/1972 | Baumgartner et al. | 340/146.3 AG |
| 3,715,724 | 2/1973 | DeMonte et al. | 340/146.3 AG |
| 3,805,239 | 4/1974 | Watanabe | 340/146.3 MA |
| 3,921,135 | 11/1975 | Komaru et al. | 340/146.3 MA |
| 3,935,562 | 1/1976 | Stephens | 340/146.3 AG |
| 3,973,239 | 8/1976 | Kakumoto et al. | 340/146.3 AG |
| 4,075,604 | 2/1978 | DeGasperi | 356/71 |

OTHER PUBLICATIONS

Dorr et al., "Adaptive Thresholding for a Mark Reading System", *IBM Tech. Disclosure Bulletin*, vol. 15, No. 8, Jan. 1973, pp. 2597–2598.

*Primary Examiner*—Leo H. Boudreau
*Attorney, Agent, or Firm*—Thomas A. Briody; Jack Oisher; Jack E. Haken

[57] ABSTRACT

A method and apparatus to reduce the redundancy for the transmission or storage of picture signals using transforms. The basis coefficients are arranged in a sequence and thereafter quantized in the customary manner. The basis coefficients obtained from the transformation are sequentially examined to see if they exceed a predetermined value, for example the average value across the entire picture. The number of times the value is exceeded is counted. If, in a sequence class, the number of coefficients exceeding the predetermined value is more than half the total number in the sequence class then the associated sequences are quantized with a larger number of bits. For this purpose, activity classes are formed which indicate which sequences in the picture are active and the characteristic of the quantizer is controlled by this class information.

5 Claims, 4 Drawing Figures

METHOD AND APPARATUS FOR ADAPTIVE TRANSFORM CODING OF PICTURE SIGNALS

The invention relates to a method and apparatus for adaptive transform picture coding wherein quantizing coefficients are obtained by means of unitary orthogonal transformation of a two-dimensional subpicture signal and indicate the picture energy for a series of subpictures. A quantization level is assigned each time to the coefficients of the subpicture in one value range, which, after a series expansion to basis coefficients, are arranged into the associated sequence or sequence classes respectively. The size and/or the number of the value ranges depends on data from the transformed picture.

Methods of transform picture coding by means of unitary orthogonal transformation are known from, for example, IEEE Transactions on Communication, Vol. Com. 19, No., 1, February 1971, pages 50–62. The Fourier, the Hadamard and the Karhunen-Loéve transformations are mentioned as examples. For these unitary orthogonal transformations the number of coefficients obtained corresponds to the number of picture elements.

For transmission or storage, it is desirable to represent pictures as accurately as possible with the least possible data, that is to say: to eliminate the redundancy, and possibly also irrelevancy, present in a picture. Such a data compression is achieved by quantizing the coefficients in a quantizer having a non-linear characteristic. The quantization of values is known in principle, for example in analog-to-digital conversion in which a given digital value is assigned to each analog value range taken as the smallest unit. A non-linear quantization is, for example, disclosed in "Proceedings of the IEEE", July 1972, pages 809–820, in which, if a given probability distribution of the values is assumed, distributions of the value ranges are given for obtaining an extremely small distortion with a different number of quantization levels. In the relevant case, during transmission or storage of pictures, the procedure is such that the basis coefficients which are found low in the sequence and whose energy furnishes a considerable contribution to the picture reconstruction, are transmitted or stored with a larger number of bits and, consequently, more accurately, whereas the basis coefficients, which are higher in the sequence are represented by a correspondingly smaller number of bits and their contribution to the picture reconstruction is, in general, smaller. If however, in certain pictures considerable energy is present high in the sequence, a visible error will result.

A method, in which the quantizing characteristic (namely the number of value ranges of the coefficients to which a different codeword is assigned during quatizing) is controlled by the picture contents is described in IEEE Transactions on Communication, July 1975, pages 785 and 786. The basis coefficients of a subpicture are multiplied by the sequence-dependent weighting factors and the products are added, resulting in a so-called activity index. Different quantizing characteristics are chosen for the relevant subpicture depending on this activity index so that fewer bits are used for transmitting and storing subpictures having a small number of details and more bits are used for subpictures having many fine details. This prior art method has, however, two main drawbacks: (1) computing the activity index for weighting factors other than one requires a multiplication and an addition for each picture element, so that computation time becomes long; and (2) the activity index always furnishes an integral information via the subpicture because the number of weighting factors is identical for all subpictures.

It is an object of the invention to provide an adaptive method enabling an optimum coding of the pictures with little cost and difficulty. Thus during quantization the size and/or the number of the value ranges in the individual sequences or sequence classes depend on the combinations of the number of coefficients in the different sequence classes which exceed a fixed threshold value associated with a sequence.

By comparing the coefficient values to a fixed threshold value and by counting the comparison results for each sequence class, it is possible to ascertain in which sequence class (or alternately in which combination of various sequence classes) there is a high activity. The sequence classes in which there is a high activity are quantized with a correspondingly higher number of bits. As a consequence, pictures having different activity can be encoded by a different total number of bits. This is necessary for the least possible redundancy. Here, and in what follows hereafter, the expression sequence class may refer to both an individual sequence and a group of consecutive sequences, the groups generally having an increasing number of basis coefficients in the higher sequences.

In a method wherein the coefficients are obtained from the successive transformation of all subpictures of a picture, an advantageous embodiment of the invention provides that, for each subpicture, the value ranges for the quantization are determined separately. Owing to the separate determination of the size and/or the number of value ranges (that is of the quantizing characteristic) for each subpicture, the areas of the overall picture having fine details are accurately transmitted yet the total number of information bits for the entire picture nevertheless remains small.

The threshold values associated with the sequences are, efficiently, the standard deviations of the coefficients of these sequences from a number of pictures. If in particular, only pictures of a given type need be transmitted or stored (such as, for example, X-ray pictures) it appears that the standard deviations are very similar for different pictures, so that fixed, equal threshold values can be chosen for all pictures without deteriorating the redundancy reduction.

It is also possible to use correspondingly different quantizing characteristics for different numbers of basis coefficients, the value of which exceeds the fixed threshold value. For the majority of practical needs it is, however, sufficient to convert the size and/or the number of the value ranges for each sequence class during quantization, if the number of coefficients exceeding the associated threshold value is greater than half the number of all coefficients of this sequence class. In this way the sequence ranges in which a picture is particularly active (that is to say: contains details with high contrast) are greatly taken into account, and the accurate transmission and reconstruction of a picture can be done with a smallest possible redundancy.

The values of the coefficients in the various sequence classes are normally of different orders of magnitude so that the entire processing must also be carried out with a corresponding large number of bits. To avoid this, it is efficient to standardize the values of the coefficients obtained during transformation before quantization. Therefore it suffices to check all coefficients to determine if they exceed the fixed value 1. This considerably simplifies the implementation.

Apparatus for performing the method according to the invention comprises a comparator which receives consecutive coefficient signals from a transformation device at one input and value signals associated with the associated sequence from a first store at a second input and supplies a reference signal when a coefficient exceeds the associated value. A first counter counts the reference signals for each sequence class and supplies an activity signal for each sequence class when a predetermined counter position is exceeded. A second store stores the activity signals for each sequence class. A processing circuit generates quantizing control signals from the output signals of the second store at the end of a picture or subpicture and enters these signals in a third store. A fourth store stores all the coefficients for a picture or subpicture and, after storing the last coefficient, applies these coefficients successively to a quantizer. The control signals stored in that third store control the quantizer during processing of the coefficients stored in the fourth store.

When standardized coefficients are used the first store can be dispensed with and the comparator then continuously receives the signals representing the fixed value 1 at the second input.

Embodiments of the invention will be further explained with reference to the drawings in which.

Figure 1:
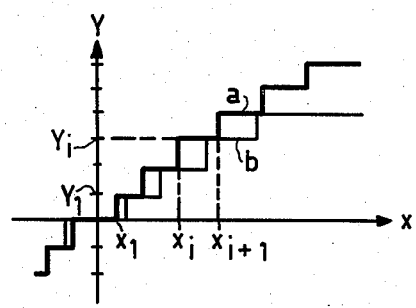
FIG. 1 illustrates the principle of the quantizing characteristic.

FIG. 1 shows two quantization characteristics a and b. These characteristics indicate output values y obtained for input values x. For low values of x the starting value y is equal to 0. From a given value $x_1$ onwards the starting value $y_1$ is obtained for the quantization characteristic a. Put in a general way, the output value $y_i$ is obtained for all values in the range $x_i \leq x < x_{i+1}$. The size of the separate value ranges increases as the value of x increases. For the quantization characteristic a the drawing shows six different levels which continue in the same manner in the negative range.

The division of an entire picture into subpictures and their transformation into sequentially arranged basis coefficient is described in the above mentioned article in "Proceedings of the IEEE", July 1972, to pages 811 and 812 which is incorporated herein by reference and to FIG. 4 thereof in particular.

If, on checking the coefficients, it is ascertained that the scanned subpicture contains few details in a given sequence range and, consequently, that the associated coefficients have only slight deviations, the exact values thereof are not very essential for the reconstruction of the picture and they may be quantized with a fairly large inaccuracy (for example with only four quantization levels in the positive and the negative directions). However, at the same time it is in general efficient to also shift the individual quantization ranges so that, for example, the quantization characteristic b is obtained. Alternatively, it is possible to choose a set of coefficients having fairly large deviations so that the individual value ranges are increased, the number of quantization levels remaining the same. This depends on the practical circumstances. In the following discussion if a change in the quantization characteristic (in the sense of a fairly large number of quantization levels) is mentioned, a possible shift of the value ranges is then also meant.

To enable a better description of the operation of the method according to the invention it is assumed, by way of example, that the sequences of the basis coefficients are fixedly arranged in three sequence classes $K_1$, $K_2$ and $K_3$, so that the sequence class $K_1$ comprises the lower sequences, $K_2$ the center sequences and $K_3$ the high sequences. Reference is made to Table I which is associated with a subpicture of $16 \times 16$ picture elements whose 256 basis coefficients, obtained after transformation, are arranged sequentially. The number of coefficients in the three sequence classes $K_1$, $K_2$ and $K_3$ is fixed: the number of coefficients in each sequence class being different (7, 24 and 225 respectively), that is to say the lower sequence class contains the smallest number of coefficients. Furthermore it is assumed that the coefficients are standardized at a standard deviation corresponding to 1, because this is normally also necessary for the quantization with non-adaptive block encoding. In this way it is namely possible to compare all coefficients having the same threshold to the standard deviation 1.

TABLE I

| Sequence number | Sequence class | Number of bits | | | |
|---|---|---|---|---|---|
| | | I | II | III | IV |
| 1 | | 10 | 10 | 10 | 10 |
| 2–3 | $K_1$ | 8 | 7 | 8 | 7 |
| 4–7 | | 7 | 5 | 7 | 5 |
| 8–15 | | 6 | 6 | 3 | 3 |
| 16–31 | $K_2$ | 5 | 5 | 2 | 2 |
| 32–63 | | 4 | 4 | 1 | 1 |
| 64–127 | $K_3$ | 2 | 2 | — | — |
| 128–256 | | 1 | 1 | — | — |

The number of coefficients in a sequence which exceed the threshold are counted. If this number exceeds half the total number of coefficients in the sequence class a corresponding activity signal is stored and the sequence class is considered to be active. If the number does not exceed half the total number of coefficients the sequence class is considered to be quiescent.

With the different combinations of active (A) or quiescent (Q) in the individual sequence classes, four different activity classes I, II, III and IV are formed in the example described in accordance with the following conditions:

if $K_1$ is active and either $K_2$ or $K_3$ is active, class I must be used if $K_1$ is quiescent and either $K_2$ or $K_3$ is active, class II must be used if $K_1$ is active and $K_2$ and $K_3$ are both quiescent, class III must be used if $K_1$, and $K_2$, and $K_3$ are all quiescent, class IV must be used.

If a sequence class is active, more than half of all the coefficients in that sequence class exceed the threshold and, consequently, have generated an activity signal. If this is not the case the sequence class is quiescent.

It is easy to see that it is possible to form additional, different activity classes from the two different states of the three sequence classes if this should be necessary for better data compression. This, however, entails additional cost and trouble.

In the example described the activity class I represents a subpicture having high total activity, class II represents a subpicture having a high activity in the range of the high sequences and few variations in the lower sequences, the definition of class III is the reverse, class IV represents a subpicture which is quiescent in its totality and which has small coefficients for all sequences. The activity classes thus obtained control the characteristic of a quantizer so that in sequence ranges having a high activity the coefficients are quantized with a higher number of bits.

Identification of the quantization characteristics used is necessary so that the sequences of the code words from the quantizer, which are generally transmitted or stored without an indication of the word limits, can be assigned in the proper manner. This information can be easily inserted with a small number of bits (in the case of the four activity classes by means of two bits, at the beginning of the code word for a subpicture).

Figure 2:
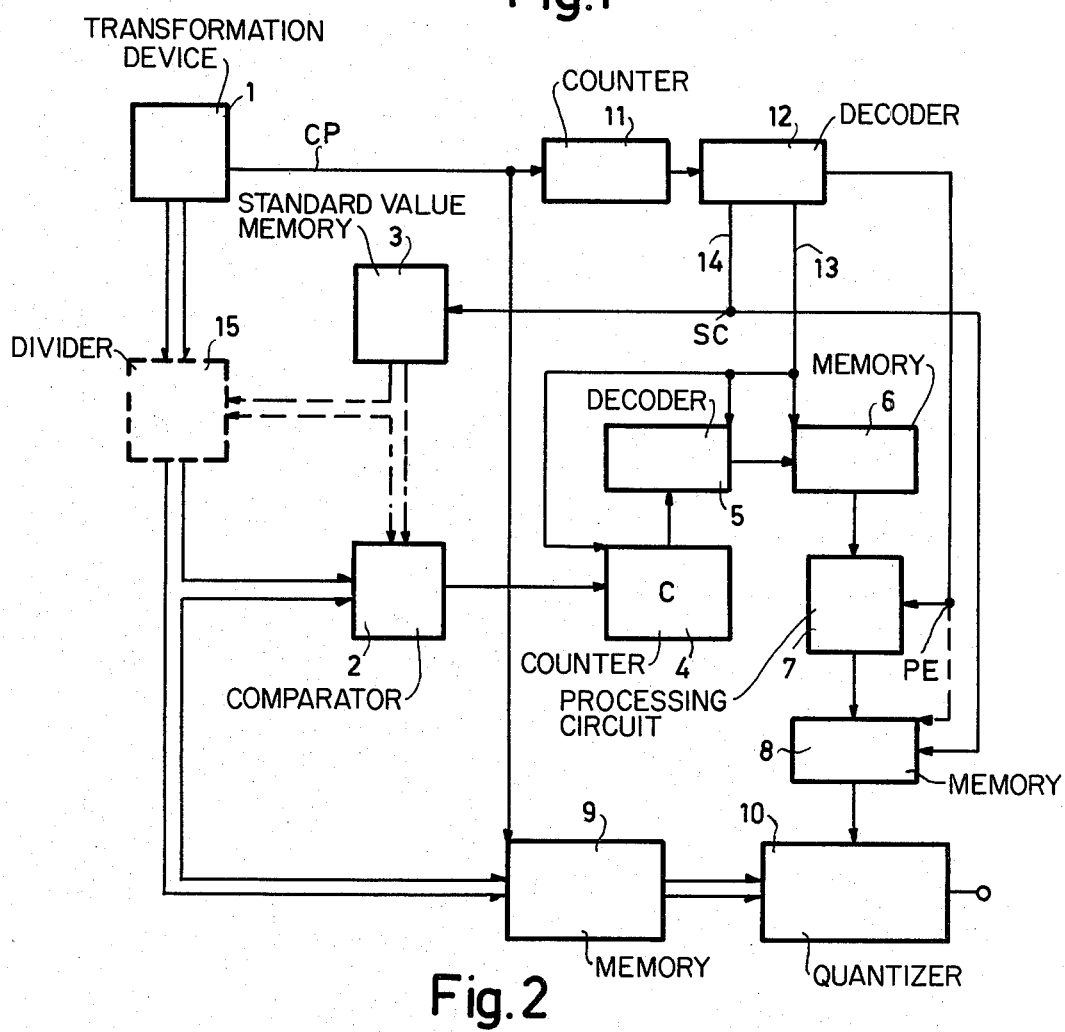
FIG. 2 is a block diagram of a quantizing arrangement.

The block diagram of FIG. 2 is an apparatus for adaptively controlling the quantizer which comprises a transformation device 1 in which the subpictures of a picture are sequentially transformed and at the output of which the basis coefficients of the individual sequences of the subpictures appear sequentially in a fixed pattern, as multi-digit binary data. These data words are applied via a plurality of parallel leads (which are shown in FIG. 2 in a simplified form as a double line) to a comparator 2 and to a memory 9 which stores the coefficients of a subpicture. For each new data word the device 1 also supplies a clock signal on the lead CP which controls the transfer of the data word in the memory 9 and which advances a counter 11 by one position. Counter 11 is a cyclic counter having a number of positions which is equal to the number of picture elements, and consequently to the number of coefficients associated with a subpicture. A decoder 12 is connected to counter 11 and decodes those counting positions at which a new sequence class of the coefficients supplied by the device 1 starts. It is assumed, for simplicity, that the coefficients are generated sequentially. If this is not the case the decoder 12 must decode each counting position at which a change in sequence class is effected, efficiently at a separate output for each sequence class. For the arrangement shown in FIG. 2, it is, however, assumed that the decoder 12 generates a signal at an output 13 between each complete sequence class.

The decoder 12 also decodes all those counter positions at which a new sequence in which the standard value of the coefficients differs from that of the preceding sequence starts and supplies a sequence-change signal SC at an output 14 for each such counter position. This signal switches the address of a standard value memory 3 one position further. Standard value memory 3 contains the standard values of the coefficients of the individual sequences; that is to say, the average values of the coefficients, from a fairly large number of similar pictures such as, for example, X-ray images, and these standard values are applied sequentially to one input of the comparator 2, while simultaneously the coefficients of the corresponding sequence of the scanned subpicture are applied to the other input. This is repeated in a cyclic manner for each subpicture. Consequently, the standard value memory 3 may be a circular shift register filled once at the start, or, alternatively, a read-only memory which is addressed by a cyclic counter.

Instead of connecting the output of the standard-value memory 3 to one input of the comparator 2 this output can alternatively be connected, as indicated by the two dashed lines, to a standardization device 15 consisting of a divider which divides the coefficients, from the device 1 by the standard value and consequently normalizes these coefficients to 1 before they are applied to the comparator 2 as well as to the subpicture memory 9. The comparator 2 then receives a fixed value 1 at said one input.

The comparator 2 compares the coefficients to the standard deviation (or the standardized coefficients to the value). If the value of a coefficient exceeds the reference value the comparator 2 supplies a signal which advances a counter 4 one position.

A decoder 5 is connected to the counter 4 and supplies a signal to a memory 6 if the position of the counter 4 corresponds to half the number of coefficients in the sequence class. If the number of coefficients in the individual sequence classes differs, the decoder 5 must be switched by the signal from decoder 12 after each sequence class to the corresponding counter position to be decoded. In addition, at the end of each sequence class, the counter 4 must be reset to the starting position and the memory 6 must be switched to the next storage position. If memory 6 is a simple shift register, a shift clock pulse is applied to it at each change of sequence class.

At the end of a subpicture, when all coefficients of this subpicture have been compared, memory 6 contains information on the activity of sequence classes in a subpicture. From the combination of the activity signals in store 6 a logic circuit 7 produces the control signals indicating one of the four activity classes (indicated above) and controls a quantizer 10. At the end of a subpicture, decoder 12 passes a "picture end" signal PE to the logic circuit 7 or to a memory 8, as a result of which the control signals are transferred to memory 8 and are available during the next subpicture for controlling the quantizer 10.

The coefficients (or the standardized coefficients) are not only applied to the comparator 2 but also to the subpicture memory 9 which has a capacity equal to all coefficients of a subpicture. Efficiently this memory 9 is a shift register for a plurality of parallel bits corresponding to the number of positions of the coefficients. At the end of a subpicture, after processing circuit 7 has transferred the control signals for the quantizer 10 to memory 8, the transfer of the coefficients from memory 9 to the quantizer 10 starts as does the transfer of the coefficients of the next subpicture from the transformer 1 (or from memory 3) to the comparator 2 and to the memory 9. Consequently, the coded words appear at the output of the quantizer 10, delayed each time by one subpicture.

Memory 8 is supplied with the signals, indicating the change in sequence, either from decoder 12 or, alternatively, from clock signal CP, as described above. Consequently memory 8 controls quantizer 10, depending on the control signals from the processing circuit 7, in such a way that the coefficients are consecutively quantized with a lower number of positions. The implementation of the quantizer 10 itself is known.

Figure 3A:
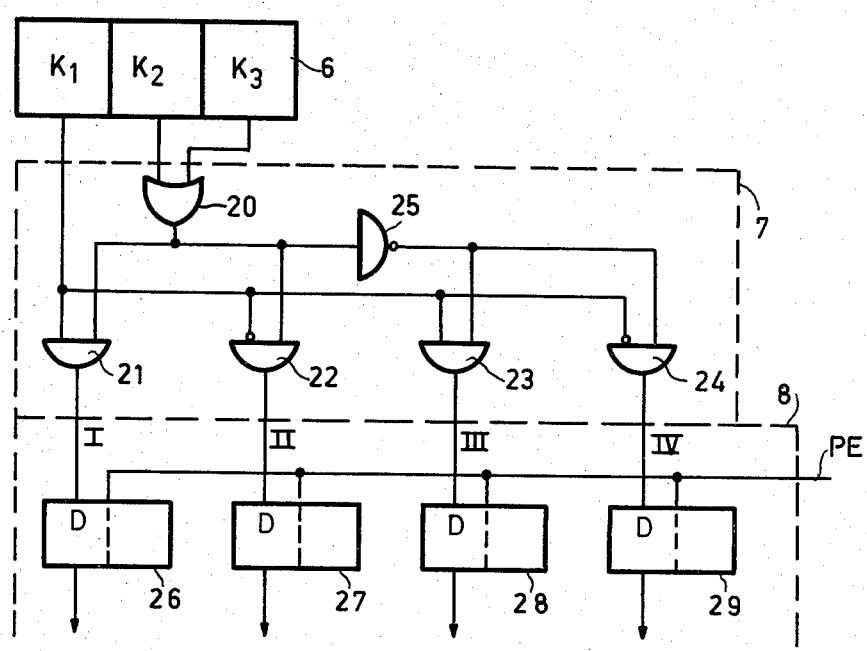
FIGS. 3a and 3b illustrate two embodiments of a processing circuit.

FIG. 3a shows an example of the implementation of the logic circuit 7. It is assumed that memory 6 has stored the activity signals for three different sequence classes in three storage positions $K_1$, $K_2$ and $K_3$ which are connected individually to the processing circuit 7.

This number of sequence classes as well as the number of four activity classes I to IV formed therefrom, corresponds to the example described above in Table I. The activity signals $K_2$ and $K_3$ for the sequence class of the center and high sequences are combined in an OR-gate 20. An AND-gate 21 produces an output signal if a signal is present in the sequence class $K_1$ for the lower sequences as well as at least in one of the two sequence classes $K_2$ or $K_3$. In a similar manner an AND-gate 22 produces an output signal indicating the activity class II if no activity signal is present in the sequence class $K_1$ for the lower sequence classes. AND-gate 23 produces an output signal and consequently indicates the activity class III, if an activity signal is present in the sequence class $K_1$ for the lower sequence, this signal, however, not being present in the sequence class $K_2$ nor in the sequence class $K_3$, the signal for the last condition being formed by an inverter 25. In a similar manner an AND-gate 24 supplies an output signal if no activity signal is present in any of the sequence classes. At the "picture end" signal PE, the signal from one of the AND-gates 21 to 24 is transferred to an associated D-flipflop 26 to 29 in memory 8 which control the quantizer 10.

Figure 3B:
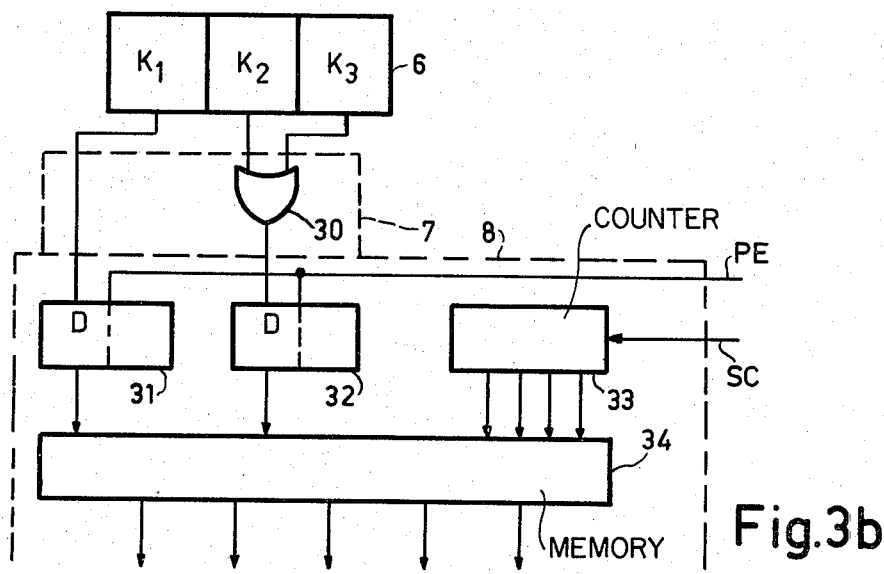

FIG. 3b shows another possibility. At the "picture end" signal PE, the activity signal $K_1$ of the sequence class with the lower sequence is directly transferred to a D-flipflop 31 and the activity signals $K_2$ and $K_3$ of the other sequence classes are transferred to a further D-flipflop 32 via an OR-gate 30. The sequence-change signals are applied to a counter 33 which advances one position each time a new sequence is received. The outputs of the D-flipflops 31 and 32 as well as the counter 33 control the address input of a memory 34 in which the signals determining the quantizing characteristic are stored. Depending on the activity signals $K_1$, $K_2$ and $K_3$ in the three sequence classes and, consequently, on the output signal of the D-flipflops 31 and 32, one of four different address groups are cycled through the counter 33 which drives in a corresponding manner, one of four groups of storage cells in which corresponding control signals for the quantizer 10 are stored.

The processing and computing unit and the memories can be implemented partly or wholly by means of a correspondingly programmed universal digital computer, a microprocessor in particular, whose program memory is programmed in a fixed manner, which results in a very simple and, as regards cost, advantageous mode of implementation.

What is claimed is:

1. A method for adaptive transform coding of picture signals comprising the steps of:
    transforming the picture signals in accordance with a unitary orthogonal transform to obtain a plurality of coefficient value signals representative of picture energy in a series of subpictures, the coefficient value signals being grouped into a plurality of sequence classes, each sequence being associated with a distinct, fixed threshold signal value;
    comparing each of the coefficient value signals with its associated threshold signal value and counting the number of coefficient value signals in each sequence class which exceed the associated threshold signal,
    quantizing said coefficient value signals, the number and range of quantization levels applied to each coefficient value signal being determined by the combinations of the number of coefficient value signals in each class which exceed the associated threshold signal value.

2. A method as claimed in claim 1 in which the picture is divided into subpictures and the coefficient value signals are obtained by the consecutive transformation of subpicture signals and wherein the quantization value ranges for each subpicture are independently determined.

3. A method as claimed in claim 1 or 2 wherein the threshold signal values associated with a sequence class represent the standard deviation of the coefficient value signals in that sequence class as measured in a plurality of representative pictures.

4. A method as claimed in claim 1 or 2 wherein the coefficient value signals are normalized prior to said quantizing.

5. Apparatus for adaptive transform coding of picture signals comprising:
    unitary orthogonal transform means connected to receive subpicture signals and to produce sequences of coefficient value signals therefrom, the coefficient value signals being grouped into a plurality of sequence classes;
    first memory means which store and supply a plurality of threshold signal values, each sequence of coefficient value signals being associated with a threshold signal;
    comparator means connected to receive coefficient value signals from the transform means and the associated threshold signal value from the first memory means and which supply a reference signal whenever a coefficient value signal exceeds the associated threshold signal value;
    first counter means connected to count the number of reference signals produced from coefficient value signals in each sequence class and to produce an activity signal whenever a predetermined count is exceeded for each sequence class;
    second memory means connected to receive and store the activity signals associated with each sequence class;
    logic means connected to receive and logically combine the activity signals derived from a subpicture signal, to produce quantizer control signals from the logical combination of signals, and to store the quantizer control signals; and
    quantizer means connected to receive the coefficient value signals produced from a subpicture signal together with the associated quantizer control signals and to quantize the coefficient value signals in accordance with a quantization characteristic which is uniquely determined by the quantizer control signals.

* * * * *